United States Patent [19]

Spanier et al.

[11] Patent Number: 5,532,010
[45] Date of Patent: Jul. 2, 1996

[54] COATED CANINE BISCUITS AND PREPARATION PROCESS

[75] Inventors: Henry C. Spanier, West Milford; William M. Bungo, Morris Plains; John W. Stevenson, Wharton, all of N.J.

[73] Assignee: Nabisco, Inc., Parsippany, N.J.

[21] Appl. No.: 68,937

[22] Filed: May 28, 1993

[51] Int. Cl.$^6$ ..................................... A21D 13/00
[52] U.S. Cl. .............. 426/94; 426/89; 426/289; 426/293; 426/302; 426/805
[58] Field of Search ................. 426/89, 94, 293, 426/302, 303, 805, 92, 289, 310, 549, 653, 656

[56] References Cited

U.S. PATENT DOCUMENTS

| | | | |
|---|---|---|---|
| Re. 30,880 | 3/1982 | Armbruster | 435/99 |
| 3,615,647 | 10/1971 | Kassens | 426/96 |
| 3,808,340 | 4/1974 | Palmer | 426/805 |
| 3,849,194 | 11/1974 | Armbruster et al. | 127/29 |
| 3,974,033 | 8/1976 | Harjes et al. | 426/98 |
| 4,000,319 | 12/1976 | Eichelburg | 426/805 |
| 4,104,406 | 8/1978 | Stringer et al. | 426/99 |
| 4,211,797 | 7/1980 | Cante et al. | 426/2 |
| 4,229,485 | 10/1980 | Brown et al. | 426/305 |
| 4,366,175 | 12/1982 | Brown et al. | 426/92 |
| 4,454,163 | 6/1984 | Gellman et al. | 426/549 |
| 4,454,164 | 6/1984 | Gellman et al. | 426/549 |
| 4,689,235 | 8/1987 | Barnes et al. | 426/89 |
| 4,822,626 | 4/1989 | Spanier et al. | 426/94 |
| 4,892,748 | 1/1990 | Andersen et al. | 426/635 |
| 4,904,494 | 2/1990 | Spanier | 426/646 |
| 4,913,919 | 4/1990 | Cornwell et al. | 426/94 |
| 5,000,940 | 3/1991 | Staples et al. | 424/49 |
| 5,015,485 | 5/1991 | Scaglione et al. | 426/94 |
| 5,114,704 | 5/1992 | Spanier et al. | 424/57 |
| 5,225,222 | 7/1993 | Cha et al. | 426/89 |

OTHER PUBLICATIONS

Johnson, Arnold H., et al "Encyclopedia of Food Technology", The Avis Publishing Company, Inc. (1974) p. 1.

Primary Examiner—Leslie Wong

[57] ABSTRACT

A coated, baked canine biscuit having enhanced palatability. The edible coating includes: (a) about 20 to about 40 weight percent of at least one dextrin or at least one maltodextrin; (b) about 0.2 to about 2 weight percent of at least one edible acidulent; (c) about 0.1 to about 1 weight percent of at least one edible antimycotic agent; (d) about 0.5 to about 5 weight percent of lecithin or at least one modified lecithin; (e) about 0.3 to about 5 weight percent of at least one polysaccharide gum; (f) about 1 to about 10 weight percent of at least one flavorant; (g) about 1 to about 10 weight percent of at least one food starch or at least one modified food starch; (h) about 1 to about 10 weight percent of vegetable fat; (i) about 30 to about 70 weight percent of meat solids; and (j) about 3 to about 16 weight percent of animal fat. All of the weight percents are based on the total weight of the dried coating minus the moisture content thereof.

12 Claims, No Drawings

5,532,010

1
COATED CANINE BISCUITS AND PREPARATION PROCESS

FIELD OF THE INVENTION

The invention relates to a coating composition for canine biscuits and to coated canine biscuits. The invention also relates to a process of preparing such canine biscuits.

BACKGROUND OF THE INVENTION

Pet foods are generally manufactured and available in dry, moist and semi-moist formulations.

Dry pet foods, which typically contain less than about 15 percent moisture, are formed primarily from farinaceous materials, and may contain small amounts of proteinaceous material and flavorings to improve palatability, as well as nutrients to insure a proper diet for the animal. While dry pet foods have excellent biological stability and can be packaged in bulk containers that need not be used immediately after opening, such dry pet foods also are often relatively low in palatability for the animal and low in perceived attraction to the consumer who purchases the product.

U.S. Pat. No. 3,615,647 (Kassens) discloses the production of expanded, fat-coated animal food having a coherent coating. The fat coating is overlaid with a coherent coating containing dextrinized starch. See for example column 3, lines 30 to 57, of Kassens.

U.S. Pat. No. 4,104,406 (Stringer et al.) discloses porous, expanded animal foods which are coated with a fat/dextrin material emulsion. See for example column 2, lines 48 to 56, of Stringer et al.

U.S. Pat. No. 4,211,797 (Cante et al.) discloses dog foods having a surface coating of a blend of a lipolyzed beef tallow and a digest of beef. The digest of beef can have a pH of 2.8 to 4.2. See for example column 3, line 64, to column 4, line 26, and the coating compositions of Examples I and II of Cante et al.

U.S. Pat. No. 4,229,485 (Brown et al.) discloses a glazed liver coated biscuit or kibble for pets. Critical to successful coating, it is disclosed, is the use of a slurry of comminuted liver, preferably beef liver, in sufficient concentration, at least 50 percent by weight of the slurry, exclusive of moisture to provide a glazed, encapsulating coating when baked. See for example column 3, lines 43 to 58, of Brown et al. The slurry bath can also contain potassium sorbate. See column 7, lines 16 to 67, and the tables in Examples 3 and 7.

U.S. Pat. No. 4,366,175 (Brown et al.) discloses a glazed liver coated biscuit or kibble for pets wherein a coating slurry comprises comminuted liver and can contain potassium sorbate. See for example the paragraph bridging columns 3 and 4, the paragraph bridging columns 5 and 6, and the tables of Examples 1 to 4, 7 and 12 of Brown et al.

U.S. Pat. No. 4,689,235 (Barnes et al.) discloses an encapsulating matrix composition containing maltodextrin. See for example Examples I to IX of Barnes et al.

U.S. Pat. No. 4,913,919 (Cornwell et al.) discloses a high solids, aqueous coating composition for modifying the texture, flavor and/or color of comestible products. The coating composition comprises from 10 to 40 percent by weight of maltodextrin and from 10 to 40 percent by weight of starch granules. See for example column 3, lines 8 to 67, and Examples 1 to 10 and 21 of Cornwell et al.

2

U.S. Pat. No. 4,904,494 (Spanier) discloses a chewy, semi-plastic, non-extruded, non-porous, microbiologically-stable dog food which includes 12 to 30 percent by weight of gelatin, at least one acidulent, at least one cereal starch-containing textural agent, at least one release agent, at least one taste agent, and at least one sugar. The dog food is in molded form and has a pH of about 3 to 5. Citric acid is the preferred acidulent. The tartness of the acidulent, it is disclosed, helps to balance the sweetness due to the sugars present in the dog snacks. See for example column 4, lines 26 to 66, column 11, lines i to 54, and column 2, lines 54 to 68, of Spanier. The use of a pH of 2 to 5, it is disclosed, results in a palatable product. See column 3, lines 15 to 21. Citric acid contributes to the flavor of the dog snack—column 8, lines 25 to 27.

U.S. Pat. No. 4,822,626 (Spanier et al.) discloses a coated canine biscuit wherein the coating comprises 10 to 40 percent by weight of dextrin, 10 to 50 percent by weight of meat, 10 to 30 percent by weight of modified corn starch, and i to 5 percent by weight of xanthan based on the total weight of dry solids. The use of an edible organic acid to obtain a coating composition having a pH of less than 6 is not disclosed in Spanier et al.

U.S. Pat. No. 5,015,485 (Scaglione et al.) discloses a coating composition for canine biscuits wherein the coating comprises 2 to 30 percent by weight of maltodextrin, 0.5 to 1.75 percent by weight of lecithin, 0.05 to 2.5 percent by weight of salt, 0.1 to 10 percent by weight of modified corn starch, 0.1 to 3 percent by weight of vegetable fat, 0.1 to 5 percent by weight of animal fat, and 0.05 to 1.5 percent by weight of xanthan gum. However, Scaglione et al. does not disclose the use of potassium sorbate, spray dried poultry byproduct digest, or an edible organic acid, particularly citric acid, to obtain a coating composition having a pH of less than 6. See for example Table 1 at columns 13 and 14 of Scaglione et al.

U.S. Pat. No. 5,000,940 (Staples et al.) discloses coating compositions for dog biscuits and is similar to U.S. Pat. No. 5,015,485. See for example column 14, lines 6 to 24, of Scaglione et al.

U.S. Pat. No. 5,114,704 (Spanier et al.) discloses coating compositions for rawhide (chews for dogs) and is similar in the coating composition disclosure to that of U.S. Pat. No. 5,015,485. See for example Table 1 at column 14 of Spanier et al. The coating solution in Spanier et al. typically had a pH in the range of 5 to 5.8.

Citric acid is used in the dog biscuits marketed by Nabisco, Inc., under the registered trademark "MILK BONE". Dogs like the flavor provided by the citric acid.

Acidulents are used in processed food products as an aid in sterilization. Sterilization of canned food products, in particular, depends on the thermal kill efficiency of the heat applied in retorts and other processing equipment. Many bacteria are highly resistant to heat and in some instances revert to a spore form which can survive high temperatures for a long period of time. Incomplete sterilization can result in instances of botulism or food spoilage. Bacteria and other deleterious microorganisms are more susceptible to thermal kill in a low pH environment. So acidification to lower the pH to a safe level is often used. Many food products, which formerly could not have been adequately sterilized, are now safely processed and maintained for long periods of time through the technique of acidification. Johnson, Arnold H., et al., "Encyclopedia Of Food Technology", The Avis Publishing Company, Inc. (1974), p. 1.

BROAD DESCRIPTION OF THE INVENTION

An object of the invention is to provide an aqueous based coating composition, for canine biscuits, which has extended microbial stability or "floor time" in the mass production of coated canine biscuits. Another object of the invention is to provide coated canine biscuits having a coating which are flavorful, palatable and attractive and is coherent without a blistering or flaking problem. Another object of the invention is to provide a process for preparing such coated canine biscuits.

The objects and advantages of the invention are achieved by the compositions and processes of the invention.

The invention involves a coated, baked canine biscuit. In the embodiments of the invention the edible coating comprises:

(a) about 20 to about 40 weight percent of at least one dextrin or at least one maltodextrin;

(b) about 0.2 to about 2 weight percent of at least one edible acidulent;

(c) about 0.1 to about 1 weight percent of at least one edible antimycotic agent;

(d) about 0.5 to about 5 weight percent of lecithin or at least one modified lecithin;

(e) about 0.3 to about 5 weight percent of at least one polysaccharide gum;

(f) about 1 to about 10 weight percent of at least one flavorant;

(g) about 1 to about 10 weight percent of at least one food starch or at least one modified food starch;

(h) about 1 to about 10 weight percent of vegetable fat;

(i) about 30 to about 70 weight percent of a dry composition comprising meat solids; and (j) about 3 to about 16 weight percent of animal fat; all of the above-mentioned weight percents being based on the total weight of the dried coating minus the moisture content thereof.

Despite the many approaches which have been taken to enhancing consumer appeal and palatability of dry pet foods, there is still a need for improved dry pet food such as canine biscuits with coatings applied thereto which will combine the nutrients and tooth-cleansing effects of a dry food or biscuit with the visual appeal, flavor and nutrients available in a proteinaceous coating. In particular, processes of improved efficiency and economy for producing coated canine biscuits are desired. The invention achieves these needs.

An advantage of the invention is that the dried coating is coherent and is resistant to blistering and flaking. The dried coating is flavorful, palatable and attractive. The dried coating is moderately resistant to moisture. The dried coating is stable and resistant to microbial action in large part to its acidity level. The coating is applied to baked canine biscuits in a thickness which enhances their visual appeal and flavor. The coated dog biscuits have a satin (not glossy) finish.

The baked dog biscuit is slightly acidic to neutral. The baked dog biscuit has a water activity of 0.70 or less. The baked dog biscuit contains 5 to 13 weight percent or less, based upon the total weight of the baked dog biscuit, of water. The baked dog biscuit is not porous and is not expanded. The baked canine biscuits are firm, dry and crunchy.

The canine biscuits provided are generally those which are baked from a dough comprising wheat flour, wheat meal, soybean meal, meat and bone meals, animal fat and water.

Preferably the acidulent is an edible organic acid, an edible inorganic acid or an edible acid salt. Most preferably the edible organic acid is citric acid. Preferably the edible organic acid is malic acid. Preferably the meats solids composition is dried meat byproduct digest, meat in particulate form and brewer's yeast. Preferably the baked canine biscuit is bone shaped. Preferably the baked canine biscuit is about 90 to about 99 weight percent, based on the total weight of the coated, baked canine biscuit, and the coating is about 1 to about 10 weight percent, based on the total weight of the coated, baked canine biscuit.

Preferably the coating comprises: (a) about 20 to about 40 weight percent of maltodextrin; (b) about 0.2 to about 2 weight percent of citric acid; (c) about 0.1 to about 1 weight percent of potassium sorbate; (d) about 0.5 to about 5 weight percent of lecithin; (e) about 0.3 to about 5 weight percent of xanthan gum; (f) about 1 to about 10 weight percent of sodium chloride; (g) about 1 to about 10 weight percent of a modified corn starch; (h) about 1 to about 10 weight percent of spray chilled vegetable fat; (i) about 30 to about 70 weight percent of spray dried poultry byproduct digest, beef particles and brewer's yeast; and (j) about 3 to about 16 weight percent of animal fat. All of the above-mentioned weight percents being based on the total weight of the dried coating minus the moisture content thereof.

The invention also involves the process of preparing the coated, baked canine biscuits of the invention. The process comprising:

(I) preparing a liquefied coating composition which comprises:

(1) admixing about 40 to 80 weight percent water, based on the total weight of the liquefied coating composition, and about 15 to about 59.5 weight percent of a dry mix, based on the total weight of the liquefied coating composition, the dry mix comprising:

(A) about 20 to about 40 weight percent of at least one dextrin or at least one maltodextrin;

(B) about 0.2 to about 2 weight percent of at least one edible acidulent;

(C) about 0.1 to about 1 weight percent of at least one edible antimycotic agent;

(D) about 0.5 to about 5 weight percent of lecithin or at least one modified lecithin;

(E) about 0.3 to about 5 weight percent of at least one polysaccharide gum;

(F) about 1 to about 10 weight percent of at least one flavorant;

(G) about 1 to about 10 weight percent of at least one food starch and/or at least one modified food starch;

(H) about 1 to about 10 weight percent of vegetable fat; and (I) about 30 to about 70 weight percent of a dry composition comprising meat solids, all of the weight percents in (A) to (I) being based on the total weight of the dry ingredients (A) to (I) to form an aqueous mixture; and (2) admixing about 0.2 to about 8 weight percent, based on the total weight of the liquefied coating solution of animal fat, the aqueous mixture to form the liquefied coating composition;

(II) coating the liquefied coating composition on a baked canine biscuit; and (III) drying the coated, baked canine biscuit, the coated, baked canine biscuit containing about 1 to about 10 weight percent, based on the total weight of the coated, baked canine biscuit, of the coating.

The process is quite economical and efficient. A single layer of the invention liquefied coating composition is applied to a baked dog biscuit (sides, top and bottom) and then dried. The baked canine biscuit is typically prepared from a dough comprising flour, meal, fat and water.

Preferably the liquefied coating composition is prepared in a first heated tank, the contents of the first tank are moved to a second heated tank and then to a heated dipping tank to fill the dipping tank. As needed in the dipping tank, further liquefied coating solution is prepared in the first heated tank, and the contents of the first heated tank are moved to the second heated tank as needed. There should be continuous stirring in all of the tanks. The heated tanks and the heated dipping tanks can be used for a longer period of time because with the invention coating solutions one can go longer without having to clean the vats due to too much microbial growth. Longer bath stability for even heated baths is achieved. Preferably the liquefied coating composition is applied to the baked canine biscuit by dipping the baked canine biscuit in the liquefied coating composition.

The use of a pH of 6 or less in the liquefied coating composition inhibits microbial growth therein. At higher pHs the microbial growth is so rapid that the liquefied coating composition cannot be made up in any significant amount of time before use—it cannot be used in time to avoid deleterious microbial growth. The use of citric acid eliminates the problem by producing a low enough pH. The liquefied coating composition is not a good growth media for bacteria. Furthermore, the citric acid is a flavor enhancer in the coating.

The liquefied coating composition is a relatively viscous composition which is pumpable and flowable and is sufficiently viscous to adhere to a dough piece to form a coating of a desired thickness. The viscosity of the composition is stable over broad temperature ranges, e.g., from 100° to 180° F. When dried onto a biscuit, the coating composition produces a flavorful coating which is moderately resistant to moisture, thus providing a coated baked biscuit which is attractive to consumers, palatable to pets and stable in transit and storage.

DETAILED DESCRIPTION OF THE INVENTION

As used herein, all parts, percentages, ratios and proportions are on a weight basis unless otherwise stated herein or otherwise obvious herefrom to one skilled in the art. As used herein, all temperatures are in degrees Fahrenheit unless otherwise stated herein or otherwise obvious herefrom to one skilled in the art.

The canine biscuits can be made in conventional manners from known doughs comprising at least one flour, meal, fat and water. For instance, when the desired product is a canine biscuit, a conventional dough for dog biscuits can be used, optionally containing discrete particles of meat and/or meat byproducts or farinaceous material. Such doughs typically contain fat solids. Examples of suitable doughs for the production of hard dog biscuits are disclosed in U.S. Pat. No. 4,454,163, and suitable doughs for the production of soft dog biscuits (containing humectant to control water activity) are disclosed in U.S. Pat. No. 4,454,164. The pertinent portions of U.S. Pat. Nos. 4,454,163 and 4,454,164 are incorporated herein by reference. Particulate proteinaceous particles, such as, particles of meat, texturized vegetable protein and/or meat byproducts, can be incorporated to add flavor to the biscuits and texturize the surface. Particulate farinaceous materials such as bran particles can also be employed to texturize the surface of the biscuits and to provide other useful properties to the product. A dough found to produce biscuits which are highly palatable to dogs includes suitable proportions of wheat flour, wheat meal, soybean meal, meat and bone meal, animal fat and natural flavors in admixture with water. The meal used in the doughs suitable for production of biscuits useful in the invention can comprise meat and/or bone and/or vegetable matter including farinaceous materials, materials prepared from legumes such as beans and peas, tuberous materials, such as potato meal, and the like. The meals can be finely or coarsely ground to control biscuit texture. Flours made from any suitable farinaceous material can be used.

The doughs generally have a water activity of about 0.90 and above upon completion of mixing of the dough ingredients. The doughs may contain farinaceous material, an edible oil, an antioxidant, an antimycotic, salt, animal fat, added vitamins and minerals, such as those disclosed in U.S. Pat. No. 4,229,485, column 5, lines 7 to 57, which is incorporated herein by reference. The compositions of the invention also preferably contain at least one animal-derived proteinaceous meal such as meat meal, bone meal and fish meal. A good biscuit dough for producing the biscuits of the invention contains about 50 to about 60 percent by weight of wheat flour, about 5 to about 10 percent by weight of soybean meal, about 3 to about 10 percent by weight of meat and bone meal, optionally about 1 to about 5 percent of wheat meal, about 1 to about 5 percent of animal fat preserved with BHA, about 20 to about 30 percent by weight of water, and about ½ to about 5 percent by weight of natural flavors, vitamin and mineral preblend, and acidulent.

The dough can also contain suitable surfactants or emulsifying agents, e.g., which are best used in minor amounts.

The dog biscuit dough can be mixed using any suitable or conventional equipment. For example, the mixing can be at 20 to 100 rpm. For example a dry blending step can be done typically at room temperature for a period of time of about 3 minutes to about 10 minutes. The dry-blended mixture can then be mixed with the hot water to form a first stage dough. The water which can be admixed with the dry-blended mixture is typically at a temperature of about 65° to about 150° F. The hot water can be added, with mixing, over a period of time of about 3 minutes to about 5 minutes to form the first stage dough. Then, the fat portion of the biscuit dough can be admixed with the first stage dough to form the final stage dough. The fat portion can be added at a temperature at which it is at least fluid, typically at about 100° to about 150° F. The fat portion can be mixed for a period of time which is sufficient to form a dough whose homogeneity is visually apparent. Exemplary final mixing times range from about 3 to about 5 minutes.

Formation of the dough is usually achieved at about atmospheric pressure with mixing of the components being conveniently achieved in an upright sigma blade mixer or other bakery-type mixers. The various ingredients can be added over a period of time or in a one-shot manner according to the above order of addition. However, melted fat and water can be added simultaneously and mixed from 6 to 10 minutes.

The dog biscuits are formed in any conventional or suitable manner, such as, by extrusion, stamping, cutting or molding. Exemplary dog biscuit shapes which may be used are bone-shaped, T-bone shaped, round, and the like. For many products, such as, the bone-shaped canine biscuits of the invention, a rotary molding system is preferred because it permits the rapid forming of dough pieces with good control over their shape, form and surface characteristics. Docker holes are preferably formed in the dough piece during molding to facilitate the escape of moisture during baking.

The dough can be then formed into pieces by machining on a rotary molder with specific die shapes. The dough can also be formed into pieces by sheeting followed by either a vertical or rotary cutter or by a rotary molder. Suitable die and cutter shapes are those which result in a round, square, triangular, T-bone or chop-shaped biscuit product and the like. The forming is achieved at conventional temperatures of ambient to 110° F. and pressures of less than 75 p.s.i. (gauge), used with a rotary molder, a vertical cutter or rotary cutter.

The dough pieces can be baked using any suitable or conventional equipment and conditions. For example, the dough pieces can be passed into an oven such as a conventional band oven where the biscuit is baked. The conveyor belts of the oven can be coated with an edible lubricant such as a natural or synthetic cooking oil or shortening to facilitate separation from the conveyor belts of the baked coated products. Temperatures in the range of about 300° to about 600° F. can be used. The baked biscuits can also be subjected to subsequent drying at temperatures of about 200° to about 400° F., either within the baking oven or separately, to produce the desired moisture content in the final product.

To repeat in part, the formed pieces are baked, followed by drying, to achieve a shelf stable product without the need of any moisture barrier protection. Baking and drying temperatures and times are those conventionally used in the production of a hard, dry canine biscuit. The pieces are dried to obtain a biscuit having a water activity of 0.70 or less. Typically baking temperatures and times are about 300° F. to about an average of 475° F. for about 25 minutes to about 8 minutes. Drying conditions are typically about 200° to about 325° F. for about 25 minutes to about 12 minutes in a forced air dryer. On a weight basis, the moisture content of the final coated biscuit product is less than or equal to 13 percent by weight, usually at least 5 weight percent, and most preferably about 10 to about 12 percent by weight, of the final biscuit at 70 percent relative humidity.

A canine biscuit dough for dog biscuits may be prepared in a continuous mixer. The canine biscuit dough can contain, for example, a liver, chicken, beef or bacon flavorant. The canine biscuit dough may be sheeted using a sheeter and then molded into a bone shape, for example, using a rotary molder. (The shaped dog biscuits can typically be small, medium and/or large biscuits.) The shaped dog biscuits may then be dried in a baking oven. The baked dog biscuits can then be dried in a dryer and then passed to storage in bins. Alternatively, the dried, baked dog biscuits could be passed directly to the dipping unit (or other coating unit) for coating with the invention liquefied coating composition.

The liquefied coating composition is preferably applied to baked, dried dog biscuits, but can be applied to baked dog biscuits which have been subjected to a post-baking partial drying operation or which have not been subjected to any post-baking drying operation.

The liquefied coating composition of the invention is pumpable and flowable to permit application with typical coating/enrobing apparatus and processes. The liquefied coating composition is relatively viscous and as applied retains a substantial proportion of its viscosity during drying, to prevent excessive dripping or runoff. The formulation as applied to the baked piece flows sufficiently to cover the entire surface of the dough piece, thereafter retains sufficient viscosity to remain in place as a coating of sufficient thickness on the dough piece.

The liquefied coating composition incorporates sufficient water to achieve liquefication of the coating composition. Amounts of other ingredients are those which are effective to achieve their functions in the coating formulation.

The coating of the baked dog biscuits is preferably achieved by dipping the baked dog biscuits into the liquefied coating composition (which is subsequently dried). Other coating methods can be used. Whatever coating method is used, the method preferably results in the coating of all of the surfaces of the dog biscuits. A thin, encompassing layer is desired, which is best obtained by a dipping scheme. In the following discussion, the invention is primarily illustrated by the dipping procedure.

Any suitable dipping scheme/procedure can be used for the coating of the liquefied coating composition. But in connection with the preparation and use of the coating solution, preferably two kettles or tanks are used. The first kettle is termed the makeup tank (two or more can be used if necessary) and the second kettle is termed the use tank. Preferably each kettle is steam jacketed, has a double-motion mixer and has inside surface scrapers. The two kettle scheme is used to supply hot liquefied coating solution to the dipping unit/tank.

The following is a description of the preferred two kettle scheme in conjunction with the dipping unit. For each batch of the coating solution, first the formula amount of cold water is added to the clean, stainless steel, first kettle (makeup tank).

For the first batch of the coating solution, the water is heated to, and held at, about 105° F. The mixer speed in the first vessel is adjusted to give a vortex and the formula amount of the dry coating mix is slowly and uniformly added into the vortex. The stirring is continued until a smooth uniform mixture results. Then steam is applied to the jacket to continue the heating. The formula amount of tallow is added when the batch temperature is 125° to 130° F. The heating is continued to 160° F. When 160° F. is reached, the mixture is transferred to the second kettle (use tank). The heating in the use tank is continued to 185° to 190° F., with continuous stirring. The mixture is held at 185° to 190° F. for about 15 minutes prior to initial use. The batch is maintained at 180° to 185° F., with continuous mixing, until it is completely transferred, as needed, to the dipping unit.

For the second and subsequent batches of the coating solution, the water is heated to, and held at, about 105° F. The mixer speed in the first vessel is adjusted to give a vortex and the formula amount of the dry coating mix is slowly and uniformly added into the vortex. The stirring is continued until a smooth uniform mixture results. Then steam is applied to the jacket to continue the heating. The formula amount of tallow is added when the batch temperature is 125° to 130° F. The heating is continued to 185° to 190° F., with continuously stirring. The mixture is held at 185° to 190° F. for about 15 minutes prior to initial use. The batch is maintained at 180° to 185° F., with continuous mixing. The batch is transferred to the second kettle (use tank) upon demand.

Stirring is continued in both kettles throughout the process.

The pH of the coating solution is 6 or less, preferably about 5 to about 5.8, most preferably 5.2, but should not be less than 2. At a pH of less than 2, the coating is probably not palatable enough and might be harmful to animals if consumed in large quantities over a prolonged period of time. The use of a pH of greater than about 6 apparently does not provide the microbial stability during processing, storage, etc., that is achieved by a pH of 6 or less. The high-acid coating helps provide high palatability and improved flavor to the coated dog biscuits, particularly when citric or malic acid is used.

The pH of the liquefied coating composition is very important to prolong the microbial stability of the liquefied coating composition during production of the coated canine biscuits. An edible, organic acid, such as, citric acid or malic acid, is included in an aqueous-based gravy to reduce the pH of the gravy to less than 6 to prolong stability of the gravy during production of the coated canine biscuit and to substantially enhance palatability of the coated canine biscuit. The pH of 6 or less results in longer times between clean ups of the vats (containing the liquefied coating compositions) without microbial problems than at higher pHs, both having the same bath temperature. Lowering the pH to say 4.4 increases the microbial stability of the coating solution.

The solvent used in the liquefied coating composition is preferably water, but other non-toxic, edible solvents, such as, ethanol or ethanol/water, can be used. The problem of the necessity of solvent removal from the coated dough due to toxicity is to be avoided. If a mixture of ethanol and water is used, the amount of ethanol in the mixture is generally about 5 to about 60 percent, preferably about 5 to about 25 percent.

Any edible (food grade) acidulent, one or more, can be used to achieve the desired pH in the liquefied coating composition. The acidulent can be, for example, an edible organic acid, an edible inorganic acid, an edible acid salt, two or more of the same category, and combinations of the categories. Examples of edible organic acids which can be used are, for example, citric acid, acetic acid, tartaric acid, lactic acid, malic acid, succinic acid, adipic acid, fumaric acid, propionic acid, sorbic acid and succinic anhydride. A preferred acidulent is malic acid. The most preferred acidulent is citric acid (it is best for price and palatability). Examples of useful edible inorganic acids are phosphoric acid, hydrochloric acid and sulfuric acid. Examples of useful edible acid salts are monobasic sodium phosphate, monocalcium phosphate, aluminum sulfate, aluminum calcium sulfate and aluminum sodium sulfate.

The pH of the liquefied coating composition is 6 or less. In preferred embodiments of the present invention, the amount of the edible acidulent, such as, citric acid or malic acid, can range between about 0.06 and about 0.6 weight percent, more preferably about 0.1 to about 0.3 weight percent, based on the total weight of the liquefied coating solution, but the amount used must be sufficient to provide the coating with a pH of 6 or less.

Citric acid provides a taste that dogs like, and contributes to the flavor of the coated dog biscuits. Citric acid, malic acid and tartaric acid provide a tart taste. The tartness of the acidulent helps to balance sweetness due to any sugars present in the dog biscuit coating. The use of citric acid allows the elimination of sugars, as used in the prior art, with the result of improved palatability.

Buffering agents which assist to maintain the pH in the invention range can be included in the coating formulation. Suitable buffering agents are normally the sodium salts of the above acids. Bicarbonate compounds (salts) and other gas producing compounds are not used in the invention coating formulation or production process from that point on, since the gas would tend to produce a porous coating on the dog biscuit.

In preferred embodiments, the liquefied coating composition can contain about 5 to about 12 weight percent, more preferably about 7 to about 9 weight percent, based on the total weight of the liquefied coating composition of a maltodextrin or a dextrin. Maltodextrins are preferred; and maltodextrin produced by hydrolyzing corn starch is preferred, but maltodextrin from any known food starch is within the scope of the invention. The maltodextrin serves as a carrier (bodying agent), an adhesive or binding agent and a suspension agent and helps the appearance of the coating. The maltodextrin is a preferred ingredient, but any suitable dextrin can be used in its place in the same amounts. Other maltodextrins can also be used for the same functions. An adhesive or binding agent, such as, maltodextrins, is needed in the coating slurry to help the coating material bind (adhere) to the dog biscuit when the dog biscuit is dipped in the coating slurry. Dextrins are the higher polysaccharides of dextrose and maltose, and are breakdown products of starch.

Maltodextrins are partial hydrolyzates of starches. Maltodextrins can be classified on the basis of dextrose equivalent (D.E.) values. Starch hydrolyzates having D.E. values up to about 20 are considered to be maltodextrins, while those having D.E. values above about 20 are considered to be corn syrups. Various methods of producing maltodextrins are known. See for example U.S. Pat. No. 3,974,033 and the prior art discussed therein. The maltodextrins having a low D.E. (dextrose equivalent), generally are made by first liquefying native starch with an acid or an enzyme to a D.E. less than about 15, followed by enzymatic conversion, e.g., with bacterial alpha-amylase (see U.S. Pat. No. 3,849,194 and Re. 30,880). As pointed out in U.S. Pat. No. 3,974,033, maltodextrins are first prepared in syrup form and then spray dried to a moisture content of 3 to 5 percent by weight.

The maltodextrin or dextrin acts as a carrier as well as aiding in viscosity control and adhesion of the coating.

In preferred embodiments, the liquefied coating composition can contain about 0.03 to about 0.3 weight percent, more preferably about 0.05 to about 0.1 weight percent, based on the total weight of the liquefied coating composition of an edible antimycotic agent. Examples of useful edible antimycotic agents are the edible benzoates or propionates, such as, sodium benzoate and calcium propionate. The preferred antimycotic agent is potassium sorbate, which also a bacteriostatic agent.

The liquefied coating composition, in preferred embodiments, can contain about 0.1 to about 1.5 weight percent, more preferably about 0.3 to about 1.0 weight percent, based on the total weight of the liquefied coating composition, of lecithin or a modified lecithin. Lecithin is preferred. The lecithin or modified lecithin is a surfactant or wetting agent which helps the coating material to be applied over the entire surface of the baked dog biscuit pieces. The lecithin or modified lecithin (and to a lesser degree, the included fat) in the coating results in the coated dog biscuit not sticking to other biscuits during production or to the dryer belts and results in a more complete and uniform coating.

In preferred embodiments, the liquefied coating composition can contain about 0.2 to about 3.0 weight percent, more preferably about 0.5 to about 1.5 weight percent, based on the total weight of the liquefied coating composition, of spray chilled fat (in powder form). The spray chilled fat is preferably spray chilled vegetable fat, but can be spray chilled animal fat. The spray chilled fat is included in the coating for flavor purposes. The spray chilled vegetable fat is preferred because it improves the appearance of the coated product, provides the coated product with gloss and raises the melting point temperature of the tallow thereby preventing the fats from "oiling" out of the coating of the product.

Preferred embodiments of the liquefied coating composition can contain about 0.05 to about 1.5 weight percent, more preferably about 0.1 to about 1 weight percent, based on the total weight of the liquefied coating composition, of xanthan gum or other suspension agent, e.g., a polysaccharide gum. The liquefied coating formulation may contain one or more than one suspension agent. Any suitable vegetable gums and mucilages, such as, guar gum or gum arabic, can be used. Xanthan gum is preferred because it is stable over a broad range of temperature and holds the same viscosity in the liquefied coating formulation over a broad temperature range. The xanthan gum has a bodying effect so that little or no separation occurs.

The liquefied coating composition in preferred embodiments can contain about 0.3 to about 4 weight percent, more preferably about 1 to about 3 weight percent, based on the total weight of the liquefied coating composition, of sodium chloride. The salt is preferably included for flavor purposes and to aid in preserving the product. Small amounts of other compatible flavorants can be included. Such other compatible flavorants can be, for example, any dairy product flavorant, such as, milk or cheese, and meat flavorants, such as, liver or beef, poultry and fish. The compatible flavorants are best water soluble. Flavorants help provide additional palatability for the invention coating.

In preferred embodiments the liquefied coating composition can contain about 0.25 to about 4 weight percent, more preferably about 0.5 to about 1 weight percent, based on the total weight of the liquefied coating composition, of food starch or a modified food starch. The food starch or modified food starch is a carrier and also serves to control the viscosity. The preferred food starch or modified food starch is modified corn starch. The portions of U.S. Pat. No. 4,689,235 related to modified food starches are incorporated herein by reference.

The liquefied coating composition in preferred embodiments may contain about 5 to about 25 weight percent, more preferably about 10 to about 20 weight percent, based on the total weight of the liquefied coating composition, of meat solids, more particularly a combination of meat solids and flavor enhancer, and preferably a combination of spray dried meat (preferably poultry) by-product digest, meat (preferably beef) in particle form and brewer's yeast or other suitable yeast. The preferred flavor enhancer is brewer's yeast, although any edible flavor enhancer can be used. The weight ratio of spray dried meat by-products digest to meat to brewer's yeast, respectively, can be about 10 to 1:10 to 1:1 and preferably is about 7 to 3:7 to 3:1.

The meat preferably is beef, but can be meat of all kinds, e.g., veal, pork, horsemeat, poultry, fish and the like. The poultry can be, for example, chicken, turkey, duck and goose. The meat by-product preferably is poultry by-product digest, but can be digests of other meat byproducts, such as, beef or pork liver, kidney, heart, spleen, tongue trimmings, lungs and skins, fish by-products (e.g., heads, offal, etc.), and poultry by-products including chicken, turkey, duck or goose offal (heads, feet, viscera). In this category, the composition most preferably is spray dried poultry by-product digest, beef and brewer's yeast.

The term "meat" is understood to apply to the flesh of cattle, swine, sheep, goats, horses, whale and other mammals, poultry and fish. The term "meat by-product" is intended to refer to those non-rendered parts of the carcass of slaughtered animals including but not restricted to mammals, poultry and the like and including such constituents as are embraced by the term "meat by-products" in the Definitions of Feed Ingredients published by the Association of American Feed Control Officials, Incorporated. The terms "meat" and "meat by-products" are understood to apply to all of those animal, poultry and marine products defined by said association.

The digest of the meat by-product component of this invention is prepared from the meat by-product. The meat by-product is subjected to proteolytic enzyme digesting in the manner as well known in the art, with reaction conditions controlled to obtain maximum flavor development. After obtaining the desired degree of digestion, the reaction mixture is typically stabilized by the addition of phosphoric acid in amounts effective to bring the pH of the digest to approximately 4.0.

Brewer's yeast is the dried pulverized cells of a yeast of the genus Saccharomyces (usually *S. cerevisiae*) used in brewing. Yeasts which provide the same or substantially the same results as brewer's yeast can be used in place of brewer's yeast.

Any suitable edible colorant food grade dye and food grade pigment can be included in the coating formulation to increase consumer eye appeal, usually for a meaty appearance. The preferred colorant is caramel color, which also provides some flavor to the product.

The liquefied coating solution can contain nutrients and/or vitamins, preferably water soluble, in small amounts.

In preferred embodiments, the liquefied coating composition may contain about 0.2 to about 8 weight percent, more preferably about 1 to 5 weight percent, based on the total weight of the liquefied coating composition, of at least one animal fat. The animal fat preferably is animal tallow. The animal fat or animal tallow can be obtained from any meat or meat by-product, such as, those set out above (e.g., cattle or sheep). The source of the tallow should be correlated with any meat flavor in the canine biscuit.

The coating slurry can be applied to the baked dog biscuit dough pieces by any suitable means, such as, spraying, dipping, soaking in a container, etc. The coating slurry is applied generally at a temperature of 45° to 200° F., preferably at about 60° to about 190° F., and most preferably at about 150° to about 170° F. The coating slurry has a long term low microbial profile at even such elevated temperatures.

The coating is preferably conducted in a dipping unit. The dipping unit preferably has two counter rotating mesh belts which are spaced from each other a distance about equal or slightly greater than the thickness of a dog biscuit when the two belts are submerged in the coating solution. The coating solution is conveyed (pumped) from the use tank into the dipping tank of the dip unit to the operating level. More specifically, the coating solution is initially pumped from the use tank to the dipping tank to fill the top and bottom sump volumes. The coating solution is continuously circulated through the external heat exchanger to maintain the coating solution in the dipping tank at a temperature of most preferably about 150° to about 170° F., e.g., about 165° F. Level controls for the dipping tank signal the pump which conveys more coating solution as needed from the use tank to the dipping tank. The baked dog biscuits are conveyed to the liquid/air interface region of the counter rotating belts and then, being located between the facing belts, are immersed in the coating solution. The immersion time should be sufficient to obtain an adequate coating in thickness and overall coverage. Exemplary immersion times range from about 1 to 5 seconds, preferably from about 2 to 3 seconds. The immersion time can be controlled by the speed of the belts.

The coating solution applied by the dipping scheme results in a thin continuous coating. The thin coating results in no drying and sticking problems.

The coated dog biscuits, upon leaving the dipping unit (or other coating or enrobing operation), are conveyed through at least one, preferably two, air curtains (of filtered air) to remove any excess coating. The excess liquefied coating material can be either discarded or returned to the dipping unit.

The lecithin in the coating allows the wet coated dog biscuits to break apart from each other after the dipping operation.

The coated dog biscuit, after the application of the coating preferably by dipping in the liquefied coating composition of the invention, may be dried at a temperature of about 125° to about 300° F., preferably about 160° to about 260° F. The drying time is preferably sufficient and effective to dry the coating and to achieve the desired moisture content (range) primarily in the coating but also in the biscuit. Exemplary drying times range from about 5 minutes to about one hour, preferably about 15 to 30 minutes.

In a preferred embodiment, the drying is conducted in two stages, that is, a pre-drying stage and then a drying stage. Separate or integral ovens/driers can be used to achieve the two stage drying operation.

The temperature used in the pre-drier may be between about 230° and about 280° F., preferably about 250° F., for a time of about 3 to about 12 minutes, preferably about 7 to about 7.5 minutes. The object is to remove about 25 to about 75 weight percent, preferably about 50 weight percent, of the moisture/water in the coating in the pre-drying step. Exemplary temperatures used in the subsequent drier (oven) range from about 150° to about 220° F., preferably about 170° to about 205° F., for a time of about 7 to about 20 minutes, preferably about 12 to about 16 minutes. The subsequent drier removes sufficient remaining water in the coating to get down to the desired end level (range) of water in the final coated dog biscuits. The drying preferably reduces the water in the coating to about 5 weight percent. The second or drying step is preferably conducted in a drier (oven) having two heating zones. The drying temperatures in the first heating zone may be from about 170° to about 180° F., preferably about 175° F., for a time of about 4 to about 9 minutes, preferably about 7 minutes. Exemplary drying temperatures in the second heating zone range from about 190° to about 210° F., preferably about 200° F., for a time of about 4 to about 7 minutes, preferably about 7 minutes. The overall drying time when two heating zones are used may be about 8 to 18 minutes, preferably about 14 minutes.

The coated dog biscuits are dried to obtain coated dog biscuits having a water activity of 0.70 or less. On a weight basis, the moisture content of the final coated biscuit product is less than or equal to about 13 percent by weight and preferably about 10 to 12 percent by weight of the final biscuit at 70 percent relative humidity. The coated dog biscuits are shelf stable at room temperatures for at least about 6 months.

The dried product may comprise about of 1 to 10 weight percent of coating and about 90 to 99 weight percent of dog biscuit base (both weight percents being based on the total weight of the dried or final coated dog biscuit).

The dried, coated, baked dog biscuit (finished product) can then be conveyed to a packaging machine/facility and packaged. The coated dog biscuit of the invention has excellent biological stability, is long lasting, is subject to little breakage and is subject to very little flaking of the coating. The coated dog biscuits of the invention are nutritionally complete biscuits. The coated dog biscuits can be packaged in bulk containers that do not have to be used immediately after opening. The packages or boxes do not have to have a liner (airtight).

The coating is hard and coherent and seals the interior base. The coating helps prevent the migration of volatile ingredients and nutrients out of the baked biscuit base. The coating protects the edible fat and the tallow in the coating against oxidative rancidity.

The coating does not require the inclusion of gelatin, liver, or other glazing agent.

The term palatability is broad and encompasses all of the various properties of animal biscuits, such as, dog biscuits sensed by the consuming animal. Among these properties are texture, taste and aroma. It is believed that the invention increases palatability as a whole, primarily through improving the taste and aroma of the biscuits.

In preferred embodiments of the invention, a canine biscuit coating composition for post-baking application to the surfaces of canine biscuits comprises an edible, organic acid, such as, citric acid (most preferred) or malic acid, in an aqueous-based gravy to reduce the pH of the gravy to less than 6 to prolong stability of the gravy during production of the coated canine biscuit and to substantially enhance palatability of the coated canine biscuit. The gravy-like coating composition also preferably comprises about 8 percent by weight of low dextrose maltodextrin, about 0.08 of potassium sorbate, about 16 percent by weight of spray dried poultry by-product digest, beef and Brewer's yeast, about 0.5 percent by weight of lecithin, about 2 percent by weight of salt, about 0.9 percent by weight of modified corn starch, about 0.8 percent by weight of spray chilled fat, about 0.3 percent by weight of xanthan gum, plus tallow and water. The fat and particularly the lecithin enable the attainment of a very thinly and uniformly coated product which does not stick to itself or to dryer conveyor belts. In the invention process, the biscuits are preferably dipped by means of upper and lower conveyor belts into the coating composition so as to coat the top, bottom, and sides of the canine biscuit.

The invention deals primarily with coated biscuits for dogs, but has a scope of coated biscuits for teeth-bearing non-human mammals, such as, cats.

EXAMPLE

The following illustrates a method of preparing the coated canine biscuit of the invention.

A canine biscuit dough for dog biscuits may be prepared in a continuous mixer. The canine biscuit dough may contain a liver, chicken, beef or bacon flavorant. The canine biscuit dough may be sheeted using a sheeter and may then be molded into a bone shape, for example, using a rotary molder. (The shaped dog biscuits may be small, medium and/or large biscuits.) The shaped dog biscuits may then be baked in a baking oven. The baked dog biscuits may then be dried in a dryer and then passed to storage in bins. Alternatively, the dried, baked dog biscuits may be passed directly to a dipping unit for coating with the invention liquefied coating composition.

A formulation of the coating solution is set out in Table 1:

TABLE 1

| COATING SOLUTION | | |
|---|---|---|
| INGREDIENTS | WT/LBS. | WEIGHT PERCENT |
| Dry Flavor Mix | 493.00 | 29.00 |
| Tallow | 34.00 | 2.00 |
| Water | 1,173.00 | 69.00 |

TABLE 1-continued

COATING SOLUTION

| INGREDIENTS | WT/LBS. | WEIGHT PERCENT |
|---|---|---|
| | (141 gal.) | |
| TOTAL | 1,700.00 | 100.00 |

The formulation of the dry flavor mix is set out in Table 2:

TABLE 2

DRY FLAVOR MIX

| INGREDIENTS | WEIGHT PERCENT[1] | WT/LBS.[2] | PERCENT[2] |
|---|---|---|---|
| Maltodextrin | 8.23 | 283.791 | 28.3791 |
| Potassium Sorbate | 0.08 | 2.759 | 0.2759 |
| Citric Acid | 0.24 | 8.276 | 0.8276 |
| Spray Dried Meat Solids/Flavorant | 15.95 | 550.000 | 55.0000 |
| Lecithin | 0.5 | 17.242 | 1.7242 |
| Salt | 2 | 68.966 | 6.8966 |
| Modified Corn Starch | 0.9 | 31.035 | 3.1035 |
| Vegetable Fat | 0.9 | 27.586 | 2.7586 |
| Xanthan Gum | 0.3 | 10.345 | 1.0345 |
| TOTAL | 29.0 | 1,000.000 | 100.0000 |

Notes:
[1] Based on the total weight of the coating solution.
[2] Based on the total weight of the dry flavor mix.

The pH of the coating solution may be 5.2.

In connection with the preparation and use of the coating solution, two kettles or tanks may be used. The first kettle is termed the makeup tank and the second kettle is termed the use tank. Each kettle may be steam jacketed, and may have a double-motion mixer and inside surface scrapers.

For each batch of the coating solution, first the formula amount of cold water may be added to the clean, 250 gallon, stainless steel, first kettle (makeup tank).

For the first batch of the coating solution, the water may be heated to, and held at, 105° F. The mixer speed in the first vessel may be adjusted to give a vortex and the formula amount of the dry coating mix may be slowly and uniformly added into the vortex. The stirring may be continued until a smooth uniform mixture results. Then steam may be applied to the jacket to continue the heating. The formula amount of tallow may then be added when the batch temperature is 125° to 130° F. The heating may then be continued to obtain a temperature of 160° F. When 160° F. is reached, the mixture may then be transferred to the second kettle (use tank). The heating in the use tank may be continued to 185° to 190° F., with continuous stirring. The mixture may be held at 185° to 190° F. for 15 minutes prior to initial use. Then the batch may be maintained at 180° to 185° F., with continuous mixing, until it is completely transferred, as needed, to the dipping unit.

For the second and subsequent batches of the coating solution, the water may be heated to, and held at, 105° F. The mixer speed in the first vessel may be adjusted to give a vortex and the formula amount of the dry coating mix may be slowly and uniformly added into the vortex. The stirring may be continued until a smooth uniform mixture results. Then steam may be applied to the jacket to continue the heating. The formula amount of tallow may be added when the batch temperature is 125° to 130° F. The heating may be continued to 185° to 190° F., with continuously stirring. The mixture may then be held at 185° to 190° F. for 15 minutes prior to initial use. The batch may be maintained at 180° to 185° F. with continuous mixing. The batch may be transferred to the second kettle (use tank) upon demand.

Stirring may be continued in both kettles throughout the process.

The coating solution may be initially pumped from the use tank to the dipping tank to fill the top and bottom sump volumes of the dipping tank. The solution may be continuously circulated through the external heat exchanger to maintain the coating solution in the dipping tank at a temperature of 150° to 170° F. (preferably 165° F.). Additional coating solution may be pumped from the use tank to the dipping tank as the level controls in the dipping unit indicate the need. The canine biscuits may be conveyed into the dipping tank and immersed in the coating solution for about 2 to 3 seconds. The immersion time can be controlled by adjusting belt speed.

The coated canine biscuits may then be conveyed through two filtered-air, air curtains. The excess coating removed may be either returned to the dipping unit or discarded. The wet, coated canine biscuits may be conveyed to the predryer (oven), having all of the zones thereof set at 250° F. and the dampers set only partially open. The transit time through the predrying oven may be adjusted to 7.0 to 7.5 minutes, during which about 50 weight percent of the water incorporated in the coated portion of the coating solution may be removed. The remainder of the water, incorporated in the coated portion of the coating solution, may be removed by further drying of the coated biscuits in the dryer. The settings for the dryer may be: 1st zone .at 175° F., 2nd zone at 200° F. A drying time of about 14 minutes may be used.

The dried, finished product may then be conveyed to a packaging line and packaged in boxes.

For the small or medium size coated dog biscuits, the yields may be:

| INGREDIENTS | PERCENT | WT/LBS |
|---|---|---|
| Coated Canine Biscuit Base (25% Each of Liver, Chicken, Beef And Bacon Flavored) | 82.6 | 100.00 |
| Coating Solution | 17.4 | 21.00 |
| SUB TOTAL | 100.00 | 121.00 |
| Drying Loss | −11.98 | −14.50 |
| TOTAL YIELD | 88.02 | 106.50 |

For the small or medium size coated dog biscuits, the weight percent of the dog biscuit (base) may be about 93.84 and the weight percent of the (dried) coating may be about 6.16.

For large size coated dog biscuits, the yields may be:

| INGREDIENTS | PERCENT | WT/LBS |
|---|---|---|
| Coated Canine Biscuit Base (25% Each of Liver, Chicken, Beef And Bacon Flavored) | 84.9 | 100.00 |
| Coating Solution | 15.1 | 17.75 |

-continued

| INGREDIENTS | PERCENT | WT/LBS |
|---|---|---|
| SUB TOTAL | 100.00 | 117.75 |
| Drying Loss | −10.40 | −12.25 |
| TOTAL YIELD | 89.60 | 105.50 |

For the large size coated dog biscuits, the weight percent of the dog biscuit (base) may be about 94.75 and the weight percent of the (dried) coating may be about 5.25.

In the Example, the temperature-viscosity profile of the coating solution may be:

| Temperature, °F. | Viscosity,[1] cps |
|---|---|
| 180° | 620 |
| 170° | 620 |
| 160° | 640 |
| 150° | 640 |
| 140° | 640 |
| 130° | 700 |
| 120 | 800 |

Note:
[1] Measurements with a Brookfield, No. 2 Spindel

In the Example, the microbial stability of the coating solution may be 8 hours and as long as 16 hours without the need to clean out the involved vats (the pH may be 5.2 or within the range of 5 to 5.8). The coating solution, without the addition of citric acid, may have a pH of 6.4 to 6.8 and a microbial stability of 2 hours without the need to clean out the involved vats.

What is claimed is:

1. A coated, baked canine biscuit, the edible coating comprising:
   (a) about 20 to about 40 weight percent of at least one dextrin or at least one maltodextrin;
   (b) about 0.2 to about 2 weight percent of citric acid;
   (c) about 0.1 to about 1 weight percent of at least one edible antimycotic agent;
   (d) about 0.5 to about 5 weight percent of lecithin or at least one modified lecithin;
   (e) about 0.3 to about 5 weight percent of at least one polysaccharide gum;
   (f) about 1 to about 10 weight percent of at least one flavorant;
   (g) about 1 to about 10 weight percent of at least one member selected from the group consisting of food starches and modified food starches;
   (h) about 1 to about 10 weight percent of vegetable fat;
   (i) about 30 to about 70 weight percent of a dry composition comprising meat solids; and
   (j) about 3 to about 16 weight percent of animal fat; all of the above-mentioned weight percents being based on the total weight of the dried coating minus the moisture content thereof,
   said coated biscuit having a hard, coherent coating and a moisture content of less than or equal to about 13% by weight and a water activity of less than or equal to about 0.7.

2. The coated, baked canine biscuit as claimed in claim 1 wherein the meat solids composition comprises at least one dried meat by-product digest, at least one meat in particulate form and brewer's yeast.

3. The coated, baked canine biscuit as claimed in claim 1 wherein the baked canine biscuit is bone shaped.

4. The coated, baked canine biscuit as claimed in claim 1 wherein baked canine biscuit is about 90 to about 99 weight percent, based on the total weight of the coated, baked canine biscuit, and the coating is about 1 to about 10 weight percent, based on the total weight of the coated, baked canine biscuit.

5. The coated baked canine biscuit of claim 1 wherein the coating comprises:
   (a) about 20 to about 40 weight percent of maltodextrin;
   (b) about 0.2 to about 2 weight percent of citric acid provided that sufficient citric acid is present to provide the coating with a pH of 6 or less;
   (c) about 0.1 to about 1 weight percent of potassium sorbate;
   (d) about 0.5 to about 5 weight percent of lecithin;
   (e) about 0.3 to about 5 weight percent of xanthan
   (f) about 1 to about 10 weight percent of sodium chloride;
   (g) about 1 to about 10 weight percent of a modified corn starch;
   (h) about 1 to about 10 weight percent of vegetable fat;
   (i) about 30 to about 70 weight percent of spray dried poultry by-product digest, beef particles and brewer's yeast; and
   (j) about 3 to about 16 weight percent of animal fat; all of the above-mentioned weight percents being based on the total weight of the dried coating minus the moisture content thereof.

6. A process of preparing a coated, baked canine biscuit, the process comprising:
   (I) preparing a liquefied coating composition which comprises:
   (1) admixing about 40 to 80 weight percent, based on the total weight of the liquefied coating composition, of water, and about 15 to about 59.5 weight percent, based on the total weight of the liquefied coating composition, of a dry mix, the dry mix comprising:
   (A) about 20 to about 40 weight percent of at least one dextrin or at least one maltodextrin;
   (B) about 0.2 to about 2 weight percent of citric acid;
   (C) about 0.1 to about 1 weight percent of at least one edible antimycotic agent;
   (D) about 0.5 to about 5 weight percent of lecithin or at least one modified lecithin;
   (E) about 0.3 to about 5 weight percent of at least one polysaccharide gum;
   (F) about 1 to about 10 weight percent of at least one flavorant;
   (G) about 1 to about 10 weight percent of at least one member selected from the group consisting of food starches and modified food starches;
   (H) about 1 to about 10 weight percent of vegetable fat; and
   (I) about 30 to about 70 weight percent of a dry composition comprising meat solids, all of the weight percents in (A) to (I) being based on the total weight of the dry ingredients (A) to (I) to form an aqueous mixture; and
   (2) admixing about 0.2 to about 8 weight percent, based on the total weight of the liquefied coating composition, of animal fat with said aqueous mixture to form the liquefied coating composition; (II) coating the liquefied coating composition on a baked canine biscuit; and (III) drying the coated, baked canine biscuit to obtain a hard, coherent coating and a moisture content of less than or equal to about 13% by weight and a water activity of less than or equal to about 0.7, the coated, baked canine biscuit containing about 1 to about 10 weight percent, based on the total weight of the coated, baked canine biscuit, of the coating.

7. The process as claimed in claim 6 wherein the liquefied coating composition is prepared in a first heated tank, the contents of the first tank are moved to a second heated tank and then to a heated dipping tank to fill the dipping tank and as needed therein, further liquefied coating solution is prepared in the first heated tank, and the contents of the first heated tank are moved to the second heated tank as needed.

8. The process as claimed in claim 6 wherein the meat solids composition comprises at least one dried meat byproduct digest, at least one meat in particulate form and brewer's yeast.

9. The process as claimed in claim 6 wherein the baked canine biscuit is bone shaped.

10. The process as claimed in claim 6 wherein the baked canine biscuit is dipped in the liquefied coating composition to apply the liquefied coating composition to the baked canine biscuit.

11. A liquefied coating composition which comprises in admixture:

(A) about 40 to 80 weight percent, based on the total weight of the liquefied coating composition, of water:

(B) about 15 to about 59.8 weight percent, based on the total weight of the liquefied coating composition, of a dry mix, the dry mix comprising:

(a) about 20 to about 40 weight percent of at least one dextrin or at least one maltodextrin;

(b) about 0.2 to about 2 weight percent of citric acid;

(c) about 0.1 to about 1 weight percent of at least one edible antimycotic agent;

(d) about 0.5 to about 5 weight percent of lecithin or at least one modified lecithin;

(e) about 0.3 to about 5 weight percent of at least one polysaccharide gum;

(f) about 1 to about 10 weight percent of at least one flavorant;

(g) about 1 to about 10 weight percent of at least one member selected from the group consisting of food starches and modified food starches;

(h) about 1 to about 10 weight percent of vegetable fat; and (i) about 30 to about 70 weight percent of a dry composition comprising meat solids, all of the weight percents in (a) to (i) being based on the total weight of the dry ingredients (a) to (i); and (C) about 0.2 to about 8 weight percent, based on the total weight of the liquefied coating solution, of animal fat, said liquefied coating composition forming a hard coherent coating on the canine biscuits upon drying the liquefied courting composition.

12. A method for the production of coated canine biscuits comprising:

(a) preparing an aqueous-based coating composition comprising at least one dextrin or maltodextrin, lecithin or modified lecithin, an antimycotic, meat solids, and citric acid, the amount of the citric acid being sufficient to reduce the pH of the coating composition to less than 6 to prolong microbial stability of the coating composition during production of the coated canine biscuits and to substantially enhance palatability of the coated canine biscuits, (b) transferring the aqueous-based coating composition to a dipping apparatus equipped with counterrrotating continuous belts which pass through the coating composition within the dipping apparatus, (c) dipping canine biscuits into the coating composition to coat the biscuits with the aqueous-based coating composition by conveying them between said counterrotating belts; and (d) drying the coated biscuits to obtain a hard, coherent coating and a moisture content of less than or equal to about 13% by weight and a water activity of less than or equal to about 0.7.

\* \* \* \* \*